No. 854,590. PATENTED MAY 21, 1907.
E. H. MUSSER.
LOCK NUT.
APPLICATION FILED FEB. 6, 1907.
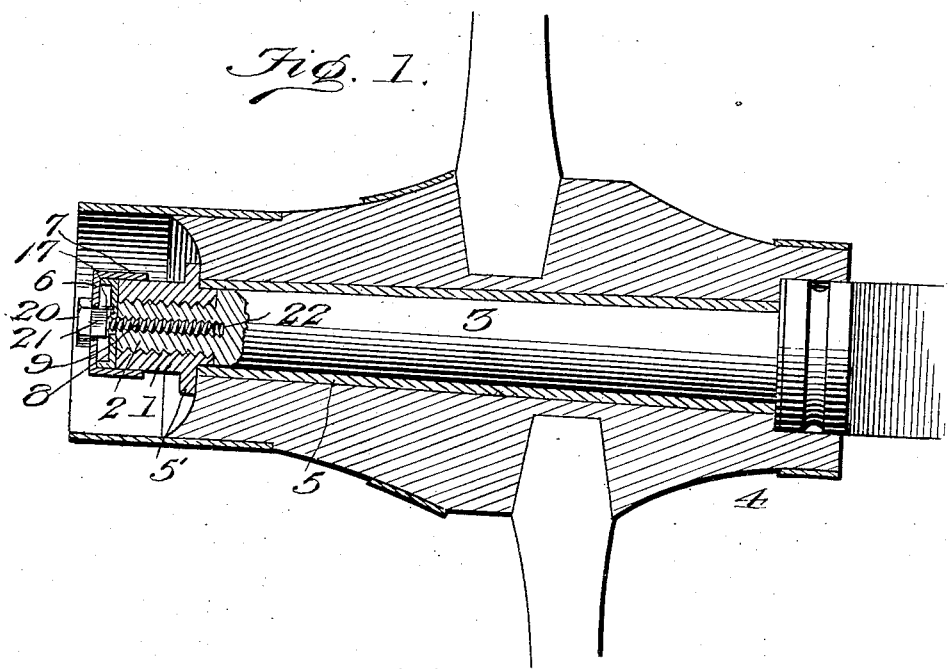

UNITED STATES PATENT OFFICE.

ERWIN H. MUSSER, OF YORK, PENNSYLVANIA.

LOCK-NUT.

No. 854,590.      Specification of Letters Patent.      Patented May 21, 1907.

Application filed February 6, 1907. Serial No. 356,091.

*To all whom it may concern:*

Be it known that I, ERWIN H. MUSSER, a citizen of the United States, residing at York, in the county of York and State of Pennsylvania, have invented new and useful Improvements in Lock-Nuts, of which the following is a specification.

The invention relates to an improvement in nut lock, particularly designed for use with the securing nut on the ordinary wheel spindle.

The main object of the present invention is the provision of means adapted to co-operate with the usual spindle nut and with the spindle to secure the nut in applied position against possibility of independent movement under ordinary strains.

The invention in a preferred form of details will be described in the following specification, reference being had particularly to the accompanying drawings, in which:—

Figure 1 is a vertical sectional view, partly in elevation illustrating the application of my improved nut lock. Fig. 2 is a view in elevation showing a portion of the wheel spindle, the securing nut therefor, and the parts of my improved nut lock, the respective elements being shown in separated relation. Fig. 3 is a perspective view of the cap member of my improvement. Fig. 4 is a perspective view of one section of the cap member. Fig. 5 is a perspective view of the other section of the cap member.

Referring particularly to the drawings, wherein is illustrated the preferred construction of the present invention, my improved nut lock is arranged for co-operation with the securing nut 1 designed for threaded engagement with the reduced threaded end 2 of an axle spindle 3, which spindle is designed to receive a wheel hub 4 in the usual manner.

While preferring that the securing nut 1 be provided adjacent its relatively inner end with an annular flange 5' designed, when the nut is in position, to retain the skein or box 5 in the hub, it is to be understood that, aside from the specific details to be hereinafter noted the parts described may be of any usual or preferred construction.

The present improvement is directed primarily to means for securing the nut 1 against independent movement relative to the spindle, and to this end comprises what I term a cap member 6 including a nut section 7 and a spindle section 8, and a threaded bolt 9 designed for co-operation with the cap member and with the spindle 3.

The nut section 7 of the cap member comprises a plate 10 corresponding in size to the surface area of the nut 1 and having end flanges 11 disposed at right angles to the plate 10 and designed when the cap is applied to engage opposing surfaces of the nut 1.

The spindle section 8 of the cap member comprises a plate 12 having edge flanges 13 projected at a right angle to the surface of the plate, the full longitudinal dimensions of the plate 12 being approximately equal to the distance between the relatively inner surfaces of the flanges 11 of the nut section 7, whereby the spindle section may be arranged within the nut section as will presently appear.

The plate 10 of section 7 is formed with an opening 14 arranged centrally of the plate, and the plate 12 of the section 8 is similarly formed with an opening 15, the opening 15 being of materially less diameter than the opening 14. The inner surfaces of the flanges 13 of the section 8 are channeled at 16 for the reception of a spring strip 17, said strip being so disposed as to project longitudinally of the plate 12 with one surface in alinement with the wall of opening 15, as clearly shown in Fig. 5.

The respective sections of the cap member are arranged as illustrated, the section 8 being disposed within the section 7 with the free edges of the flanges 13 abutting against the inner surface of the plate 10. By this arrangement the respective plates 10 and 12 are maintained in spaced relation, it being understood that the flanges 11 are of such a length as to project beyond the plate 12 when the parts are assembled. The spring 17 is preferably coextensive in width with the length of the flanges 13, so that the space between the plates 10 and 12 is bridged by the spring as shown, when the sections are assembled. The respective sections are secured in connected relation through the medium of a screw 18 or other connective.

The screwbolt 9 of the locking means comprises a threaded shank 19, and a head 20 designed to receive any suitable tool for operating the bolt. Intermediate the shank and head 20 the bolt is formed with an auxiliary head 21, preferably rectangular in plan and of greater sectional dimension than the diameter of the opening 15, though less than the diameter of the opening 14. The length of the auxiliary head is preferably equal to or slightly greater than the space between the plates 10 and 12, as will be evident from Fig. 1. The spindle 3 is formed for the reception of the threaded shank 19, being for this purpose provided with a longitudinally extending bore 22 threaded in a reverse direction to the threads on the spindle arranged for the reception of the nut 1.

In application, after securing the nut 1 in applied position, the cap member is placed to cause the projected portions of the flange 11 to engage opposing surfaces of the nut 1, the plate 12 of the spindle section of the cap member resting upon the relatively outer end of the spindle and nut 1. In this position of the parts the openings 14 and 15 are alined with the bore 22, and the securing or locking means is completed by the application of the screw bolt 9. The shank 19 of the bolt is threaded into the bore 22 by an obvious operation of the bolt, which is continued until the auxiliary head 21 is seated in the space between the plates 10 and 12. As said auxiliary head is of greater diameter than the opening 15, each revolution of the bolt 9 tends to laterally displace the spring 17, as will be obvious. With the bolt 9 in fully operative position, the spring 17 will bear snugly against one of the square surfaces of the auxiliary head 21, thereby preventing independent revolution of said bolt. As the cap member engages the securing nut 1, and, as above described, is locked to the spindle 3, it is obvious that independent movement of the securing nut is effectually prevented.

While primarily adapted for use as a means for securing the nut on a wheel spindle, it is obvious that the locking means described is readily adapted for effective use in other relations, and it is to be understood that I contemplate its use as a means for preventing independent rotation of a nut designed to be engaged with any coöperative element.

Having thus described my invention, what I claim as new is:—

1. The combination with a spindle and a securing nut therefor, of a cap member having a nut section to engage the securing nut, a second section to engage the spindle, a spring plate carried by the second section, and a threaded bolt to engage the spindle, said bolt having a head to be engaged by the spring to prevent independent movement of the bolt.

2. The combination of a spindle having a threaded end and a securing nut to co-operate with said threaded end, of a cap member including a nut section formed with flanges to engage opposing surfaces of the nut, a spindle section secured within the nut section and comprising a plate spaced from the plate of the nut section, a spring carried by the plate of the spindle section, and a bolt designed to be passed through the plates of said member and engage a longitudinal bore in the spindle, said bore being reversely threaded with relation to the nut receiving portion of the spindle, the bolt being provided with a head designed to be engaged by the spindle to prevent independent rotation of the bolt.

In testimony whereof, I affix my signature in presence of two witnesses.

ERWIN H. MUSSER.

Witnesses:
 HARRY S. EBERT,
 GEORGE L. HOLLAND.